Figure 1:
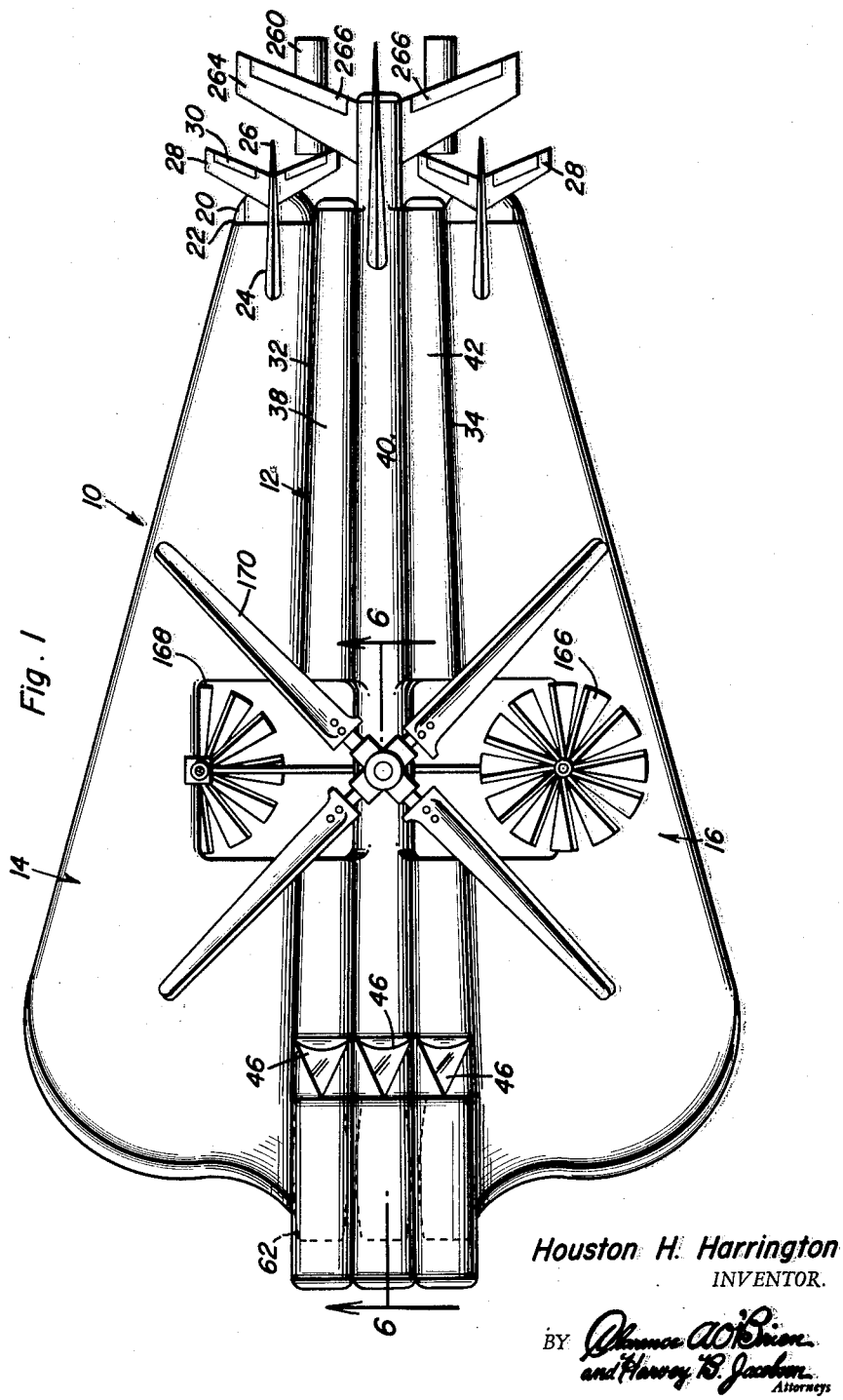

Nov. 10, 1964 H. H. HARRINGTON 3,156,434
VTOL AIRCRAFT
Filed March 28, 1962 5 Sheets-Sheet 1

Houston H. Harrington
INVENTOR.

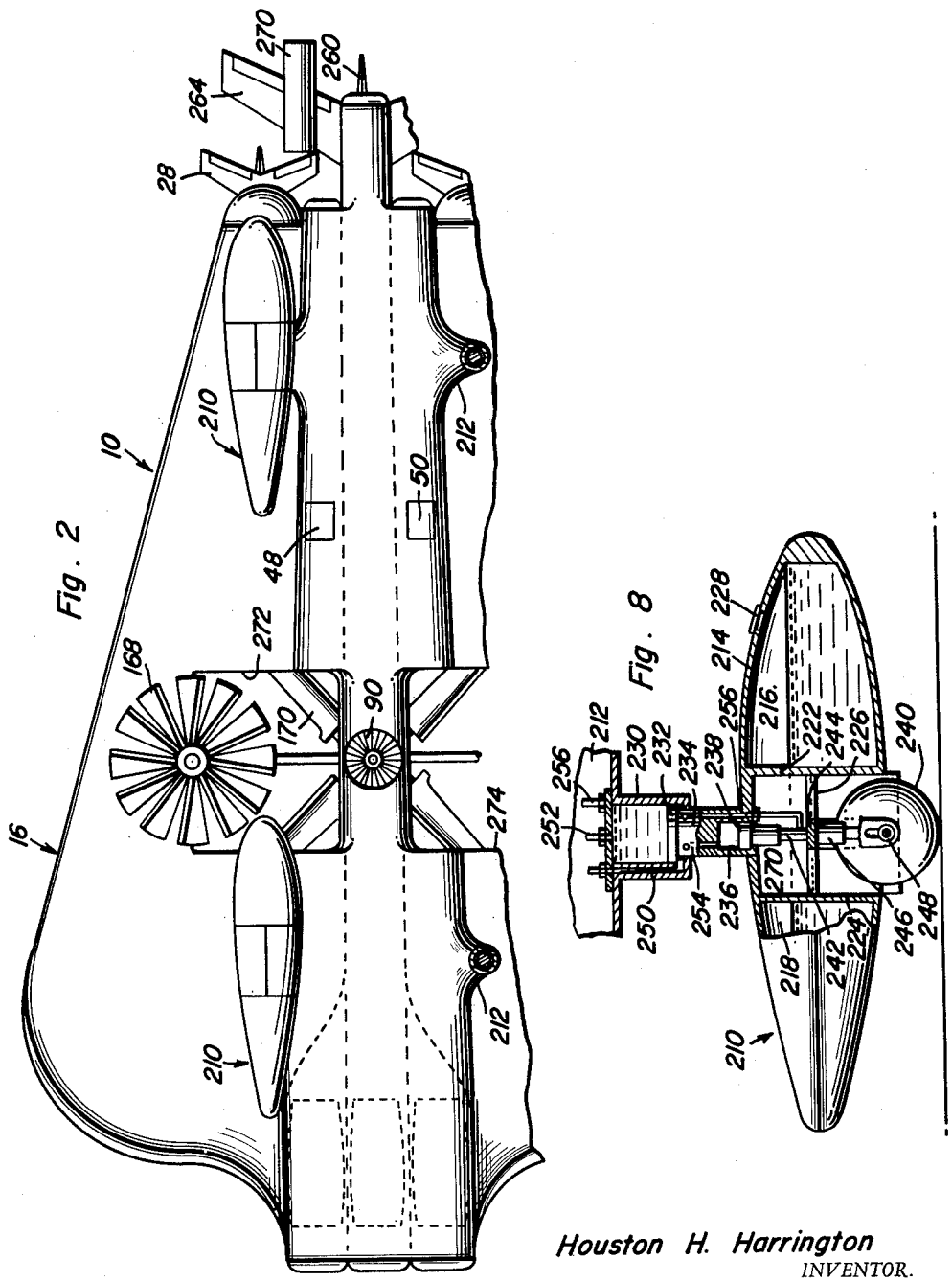

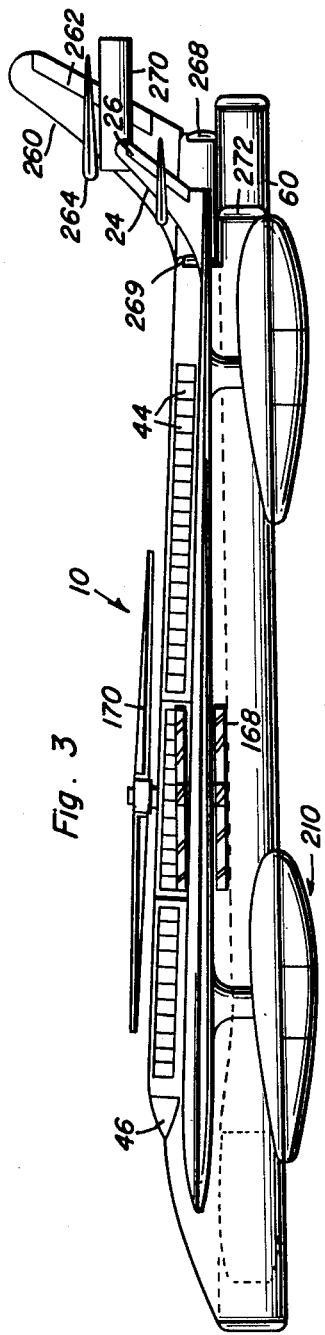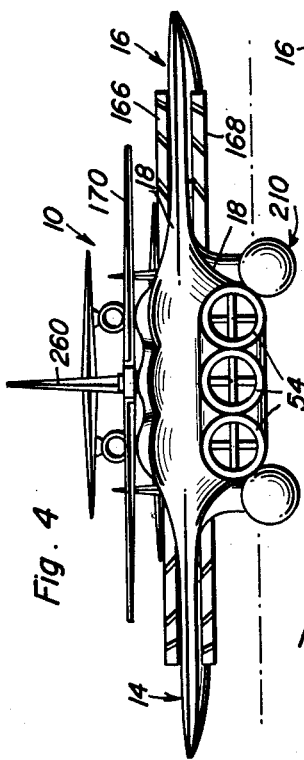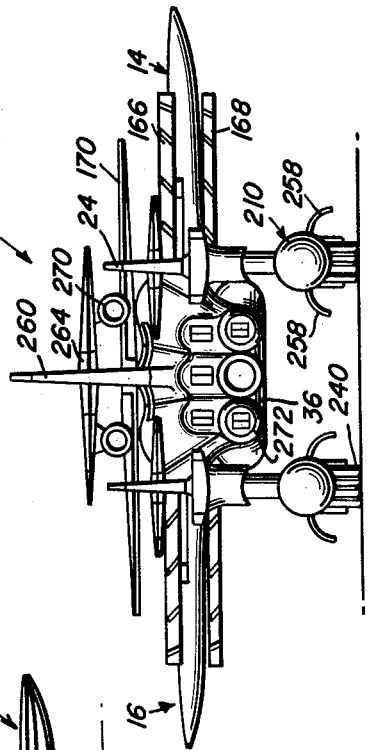

Nov. 10, 1964    H. H. HARRINGTON    3,156,434
VTOL AIRCRAFT

Filed March 28, 1962                5 Sheets-Sheet 4

Houston H. Harrington
INVENTOR.

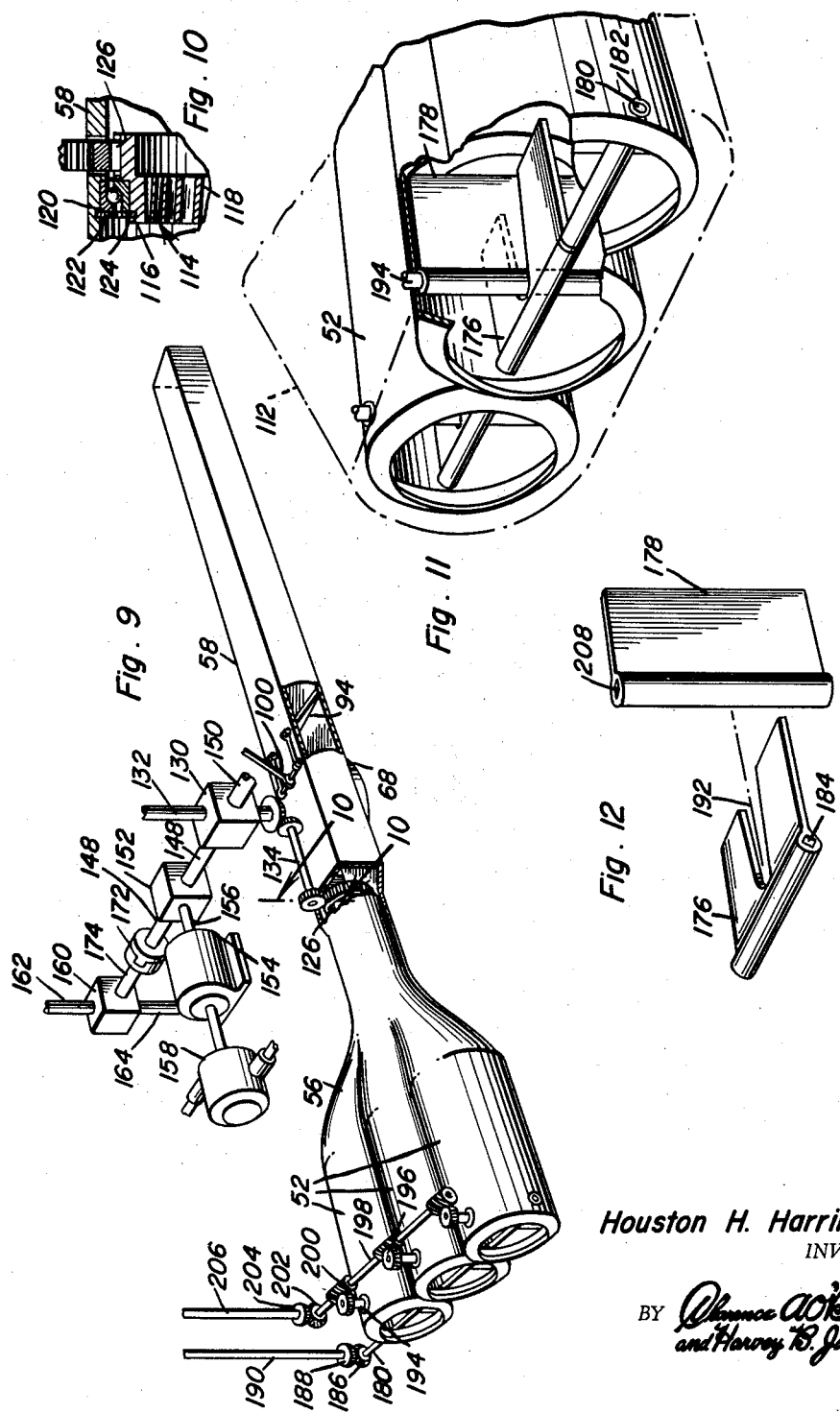

United States Patent Office 3,156,434
Patented Nov. 10, 1964

3,156,434
VTOL AIRCRAFT
Houston H. Harrington, 1728 W. Monroe St.,
Chicago 12, Ill.
Filed Mar. 28, 1962, Ser. No. 183,075
7 Claims. (Cl. 244—7)

This invention relates to aircraft, and particularly to aircraft which not only can rise and descend vertically, but can also fly horizontally as conventional aircraft at high speeds.

Accordingly, it is a primary object of the invention to provide an aircraft which can not only rise and descend vertically as a helicopter, but also can fly horizontally at high speeds as conventional aircraft.

It is another object of the invention to provide an aircraft that may land on water, ice or dry land and is provided with tanks which house the wheels and fuel for the aircraft. These tanks not only serve as pants or streamlined housings for the wheels, but may also be used as floats when the aircraft is operating on water.

It is another object of the invention to provide an aircraft with jet or rocket engines, the exhaust from these engines being normally directed towards the rear of the aircraft so as to propel it forwardly. However, means are provided in the aircraft for deflecting the exhaust downwardly whereupon it will create an upward thrust for providing vertical lift, and this means may also cause the exhaust from the engine to be directed through turbines for operating helicopter-type blades on the aircraft for providing additional lift.

It is another object of the invention to provide an aircraft with engines having flight control surfaces mounted in the intake ducts or manifolds of the engines.

It is another object of the invention to provide an aircraft which has a plurality of engines mounted at the forward end of the aircraft for proper balance, yet the engines exhaust at the rear of the aircraft so as to reduce the noise level within the fuselage thereof.

It is another object of the invention to provide an aircraft having an improved landing gear.

It is yet another object of the invention to provide an aircraft which has power operated elevators in the bottom of its fuselage for loading and unloading freight and passengers.

It is yet another object of the invention to provide an aircraft that will not only fly at high speed, but will also land and take-off at very small airports thus saving substantial amounts of money in the construction of airfields.

Figure 6:
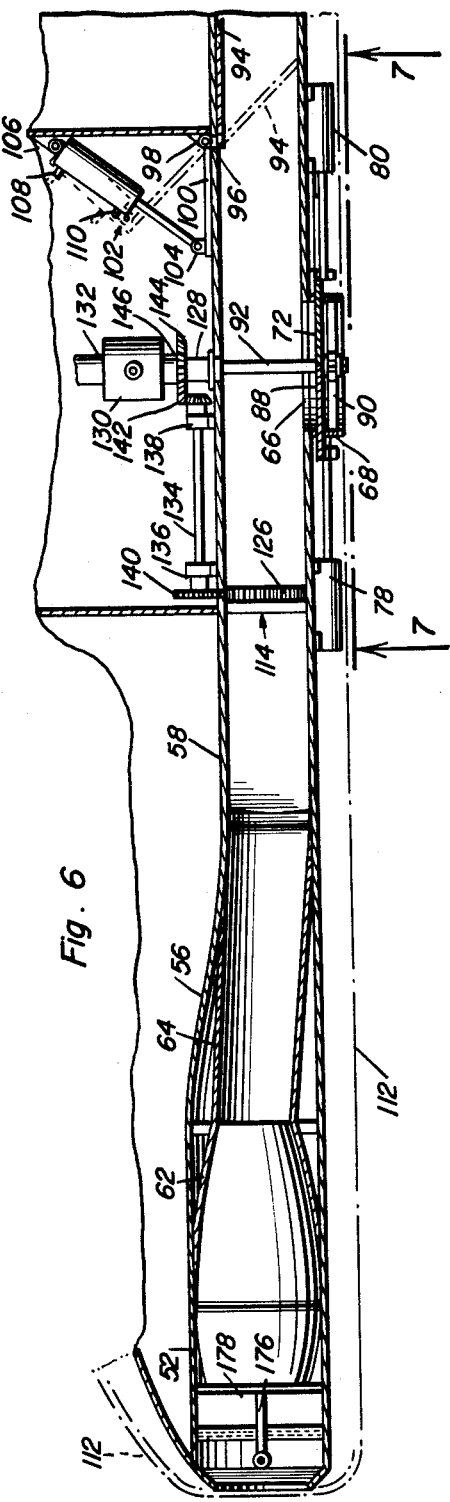
Figure 7:
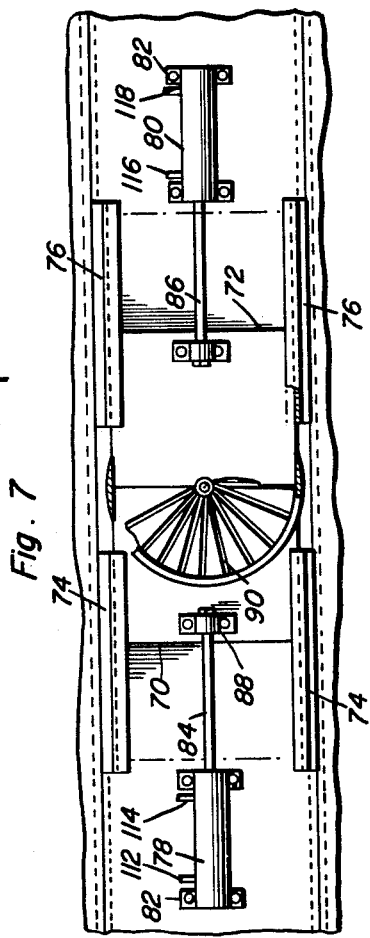

These together with other objects and advantages which will become subsequently apparent reside in the details of consruction and operation as more fully hereinafter described and claimed, reference being had to the accompanying drawings forming a part hereof, wherein like numerals refer to like parts throughout, and in which:

FIGURE 1 is a plan view of the invention;
FIGURE 2 is a bottom view of the invention with one wing broken away;
FIGURE 3 is a side elevational view;
FIGURE 4 is a front elevational view in flight;
FIGURE 5 is a rear elevational view with landing gear and wheels extended;
FIGURE 6 is an enlarged cross-sectional vertical view taken substantially on the plane of line 6—6 in FIGURE 1;
FIGURE 7 is an enlarged cross-sectional view taken substantially on the plane of line 7—7 in FIGURE 6;
FIGURE 8 is a vertical view of one landing gear with parts broken away;
FIGURE 9 is a diagrammatic perspective view of the main propulsion engines and driving means for the helicopter rotors;
FIGURE 10 is an enlarged cross-sectional view taken substantially on the plane of line 10—10 in FIGURE 9;
FIGURE 11 is an enlarged perspective view of the main engine intakes with parts broken away; and
FIGURE 12 is a perspective exploded view of one set of auxiliary controls shown in FIGURE 11.

Referring to the drawings, it can be seen that the aircraft 10 comprises an elongated fuselage 12 having wings 14 and 16 secured to each side thereof and extending substantially horizontally. As shown in FIGURE 4, arcuate fairing 18 provides a streamlined connection between the wings and fuselage.

Each of the fixed wings or airfoils 14 and 16 is of substantially triangular shape and the outer edges of the wings converge in a rearward direction towards the tail of the aircraft. Arcuate or semi-circular flaps 20 are pivotally connected on horizontal axes to the trailing edges 22 of the wings. An auxiliary fin 24 is secured to the center of each wing at the trailing edge thereof and extends substantially normal thereto. An auxiliary rudder 26 is pivotally connected on a generally vertical axis to the trailing edge of each of the fins 24. Swept back ailerons 28 are pivoted on horizontal axes to the central portions of the fins 24. Each aileron 28 is provided with a pair of trim tabs 30.

The fuselage 12 has sides 32 and 34 connected by a flat bottom 36 and arcuate roof sections 38, 40 and 42. The sides of the fuselage are provided with a plurality of windows or portholes 44 and the upper front portion of the fuselage is provided with windshields 46.

As shown in FIGURE 2, the bottom 36 of the fuselage is provided with two rectangular openings which permit the raising and lowering of elevators 48 and 50 into and out of the fuselage. The bottoms of these elevators normally close these openings when retracted within the fuselage.

The nose of the fuselage houses three side-by-side jet engines 52 and is provided with three inlet passages 54 for supplying air to these engines. As shown in FIGURE 9, each of the engines has an exhaust connected to an elongated exhaust pipe 58 by means of a tapered manifold. The end of the fuselage 12 terminates in a central rearwardly extending exhaust extension 60 as more clearly seen in FIGURE 3. The exhaust pipe 58 extends longitudinally through the entire length of the fuselage and its end is in communication with the extension 60.

As shown in FIGURES 6 and 7, each of the engines 52 includes a combustion chamber 62 which is connected to the exhaust pipe 58 by means of a pipe 64 within manifold 56. A circular outlet port 66 is provided in the bottom of the exhaust pipe 58 and is concentric with an annular flange 68 which is secured at its outer edges to the lower surface of the exhaust pipe. The upper forward and rear sides of the flange 68 are provided with slots which slidably receive the rectangular valve plates 70 and 72. Each valve plate is slidably guided also by a pair of tracks 74 or 76 which are secured to the underside of the pipe 58 by means of rivets and are substantially Z-shaped in cross section. A pair of hydraulic motors 78 and 80 are also secured to the underside of the exhaust pipe 58 by means of horizontal flanges 82. The motor 78 is connected to the valve plate 70 by means of a piston rod 84 while the motor 80 is connected to the valve plate 72 by means of a piston rod 86. Both of the rods are secured to the valve plates by means of a U-shaped clamp 88 riveted to the valve plate. A gas operated turbine wheel 90 is rotatably supported within the annular flange 68 below the valve plates by means of a vertically extending shaft 92 so that it may be selectively powered by a downward flow of gas.

Directly behind the shaft 92 is located a rectangular valve plate 94 which as ears 96 extending through slots in the top of the exhaust pipe 58 and pivotally mounted on horizontal axes to lugs 98 secured to the framework of the aircraft fuselage. An arm 100 is fixed to one of the lugs 96 and extends parallel to the valve plate 94. A conventional double-acting hydraulic motor 102 is pivotally connected between an ear 104 secured to the arm 100 and a lug 106 secured to the fuselage structure. The double-acting motor 102 is provided with hydraulic conduits 108 and 110 which extend to a suitable control valve in the pilot's compartment. Likewise, the hydraulic motors 78 and 80 are also provided with conduits 111, 113, 115 and 117 which also lead to suitable control valves in the pilot's compartment.

As shown in FIGURE 6 in broken lines, the exhaust pipe 58 and the various mechanisms connected thereto are completely enclosed by the skin 112 of the fuselage. As shown in FIGURE 2, the skin 112 is also provided with a circular opening aligned with the edges of the annular ring 68 exposing the turbine wheel 90.

As shown in FIGURES 6, 9 and 10, an auxiliary turbine wheel 114 is mounted in the pipe 58 forwardly of the shaft 92 so as to continuously rotate on a horizontal axis in response to exhaust flow of gas from the engines 52. The turbine wheel 114 includes an annular rim 116 with inwardly extending turbine blades 118 secured thereto. The forward portion of the rim 116 is rotatably journaled within a circular portion of the pipe 58 by means of a relatively large anti-friction bearing 120 held in position by snap rings 122 and 124. The rear portion of the annular rim 116 is slightly larger in diameter than the forward portion and is provided on its outer periphery with an annular series of gear teeth 126.

As shown in FIGURES 6 and 9, the shaft 92 extends into and through a sleeve 128 which mounts and supports the gear box 130 on the pipe 58. The shaft 92 extends into the gear box 130 wherein it is drivingly connected by conventional reduction gearing to the main propeller shaft 132. A horizontal shaft 134 is rotatably journalled on top of the pipe 58 by means of conventional journals 136 and 138. The ends of shaft 134 are fixed to gears 140 and 142. The gear 140 extends through a transverse slot in the upper portion of pipe 58 and meshes with the gear teeth 126. The gear 142 meshes with a gear 144 which is secured to a sleeve 146. The sleeve 146 is journalled on the outer surface of sleeve 128 and extends upwardly into the gear box 130 where it is drivingly connected by means of conventional reduction gearing to horizontal shafts 148 and 150. Each of the horizontal shafts 148 and 150 extend through and are journalled in a gear box 152. Gears within each of the gear boxes 152 drivingly connect shaft 148 to a conventional generator 154 which supplies electric current for auxiliary apparatus within the aircraft. The generator is connected to the gear box by means of a shaft 156 which extends through the generator and also drives a conventional hydraulic pump 158 which supplies hydraulic pressure to various devices in the aircraft operated by hydraulic means.

Each of the shafts 148 and 150 has its outer end extending into an outer gear box 160 wherein the shaft is drivingly connected to vertical auxiliary propeller shafts 162 and 164. The shafts 162 are connected at their upper ends to auxiliary helicopter propellers 166 located above each wing of the aircraft and the shafts 164 are connected at their lower ends to auxiliary helicopter propellers 168 located below each wing. The main propeller shaft 132 is connected to a main central helicopter propeller 170 which constitutes a rotatable airfoil. The main propeller 170 preferably rotates in a direction which is opposite to the direction of rotation of the propellers 166 and 168 so as to eliminate torque. Alternatively, two coaxial propellers located one slightly above the other could be driven in opposite directions by the gear box 130 and each pair of auxiliary propellers on each side of the aircraft could be driven in opposite directions so as to eliminate torque. If desired, the main shaft 132 could be extensible so that the main propeller 170 could be retracted into recesses within the wings and the fuselage of the aircraft 10 when this propeller is not being used. As shown in FIGURE 9, shafts 148 and 150 are connected to the auxiliary gear boxes 160 by means of remotely controlled clutches 172 and shafts 174. During operation of the aircraft, the exhaust from engines 52 causes continuous rotation of the auxiliary turbine wheel 114 whereby it drives the generator 154 and hydraulic pump 158 by means of gears 126 and 140, shaft 134, gears 142 and 144, gear box 130, shafts 148, gear box 152 and shaft 156. The auxiliary helicopter propellers 166 and 168 are driven by the turbine gear 126 only when the clutches 172 are engaged. The main propeller 170 is driven only by the turbine 90 when valve 94 is closed or partially closed and valve plates 70 and 72 are opened so as to direct the flowing gas through the blades of the turbine. Turbine 90 drives the main propeller 170 by means of shaft 92, gear box 130 and shaft 132.

The intakes of the engines 52 are provided with auxiliary flight controls including auxiliary elevators 176 and auxiliary rudders 178. A horizontal shaft 180 extends through the forward central portion of each engine intake and is pivotally mounted therein in journals 182. Portions of shaft 180 are rectangular in cross section and extend through rectangular bores 184 in the forward portions of the auxiliary elevators 176 so that the shaft and elevators are drivingly connected to one another. The outer end of shaft 180 is secured to a bevel gear 186 which meshes with another bevel gear 188. Gear 188 is secured to a vertical shaft 190 which extends into the cockpit of the aircraft whereby the shaft 190 may be oscillated so as to oscillate shaft 180 and auxiliary elevators 176 secured thereto.

Each of the auxiliary elevators 176 is provided with a V-shaped slot 192 rearwardly of shaft 180. A vertical shaft 194 extends through the forward portion of each engine intake and is journalled therein. Each shaft 194 extends through the forward portion of one of the slots 192 and has an upper end fixed to a gear 196. A horizontal shaft 198 is journalled above the engines 52 and has a plurality of spaced worm gears 200 secured thereto and a bevel gear 202 is fixed to one of its ends. Worm gears 200 each mesh with one of the gears 196 and the gear 202 meshes with a bevel gear 204 secured to a control shaft 206 which also extends into the pilot's compartment of the aircraft. Each of the shafts 194 has a rectangular central portion which extends through a rectangular bore 208 in the forward portion of each auxiliary rudder 178. Oscillation of shaft 206 causes oscillation of each of the auxiliary rudders 178 in an obvious manner.

The landing gear of the aircraft includes four substantially identical floats 210 each mounted by similar means to a lateral projection 212 secured to a side of the aircraft fuselage. Each float 210 includes a streamlined teardrop shaped housing 214 divided into two liquid storage compartments 216 and 218 and a wheel well compartment 220 by means of transverse vertical partitions 222 and 224. The compartments 216 and 218 are connected by conduit 226 and are filled by an opening normally sealed by a cap 228. The fluid in compartments 216 and 218 may comprise fuel, or fire fighting fluid as carbon tetrachloride, etc.

A main cylinder 230 is secured below each of the projections 212 and has a vertical bore therein which slidably contains the main piston 232. The main piston 232 has a reduced downwardly extending extension 234 which has a vertically extending cylindrical bore 236 in its lower end. A secondary hydraulic piston 238 is slidably contained in bore 236 and is connected to the landing gear wheels 240 by means of rod 242, horizontal plate 244 and resilient shock absorbers 246. The lower ends of the shock absorbers 246 are connected to horizontal wheel axles 248.

The piston extension 234 is secured to the float 210 whereby the float may be retracted and extended by supplying fluid pressure to opposite sides of piston 232 by means of conduits 250 and 252. Wheels 240 may be retracted into or extended out of the wheel wells 220 by supplying fluid to opposite sides of piston 238 by means of conduits 254 and 256. Wheel well covers 258 are pivotally secured by means of hinges 226 to the sides of the float housings 214. Linkage means (not shown) of a conventional nature are connected between the plates 244 and covers 258 so that the covers are automatically opened and closed as the wheels 240 are extended and retracted.

A primary fin 260 is secured to the center of the rear of the fuselage. This fin has pivoted thereto a conventional rudder 262. Secured to the central portion of fin 260 is a horizontal stabilizer 264 which has conventional elevators 266 pivotally connected to its trailing edges. Fin 260 is secured to a rearwardly extending portion of the central portion of the fuselage which terminates in emergency escape doors 268.

A pair of auxiliary jet or rocket engines 270 are secured below each side of the stabilizer 264.

Openings are preferably provided in the wings and fuselage of the aircraft 10 so as to permit free flow of air to and from the helicopter propellers. As illustrated in the drawings, the openings are shown as being of rectangular shape and indicated by the reference numerals 272 and 274. If desired, the openings may be made much larger than illustrated in the drawings.

For normal take-offs and landings, valve plates 70 and 72 are operated to the open position by means of hydraulic motors 78 and 80 and the valve plate 94 is moved to the closed position by fluid motor 102 as illustrated in dotted lines in FIGURE 6. The hydraulic motors are controlled by control valves in the pilot's compartment of the aircraft. The exhaust gases from combustion chambers 62 flow through pipe 64 into exhaust pipe 58, but since they are blocked by the closed valve plate 94, the gases are forced downwardly through port 66 and gas turbine wheel 90 so as to cause rotation of the turbine wheel, the shaft 92 and the main rotor 170. An upward lifting force is applied to the craft by both the main rotor 170 and the reaction from the gases ejecting downwardly from port 66. These lifting forces cause the aircraft to rise. Additional lift may be obtained by engaging clutches 172 so as to operate the auxiliary helicopter rotor blades 166 and 168 on each side of the aircraft. These auxiliary propellers may also be used for control purposes since the clutches 172 on opposite sides of the aircraft may be individually controlled. While the aircraft is rising vertically, yaw control is obtained by operating the auxiliary rudders 178 in the intakes of the engines by means previously described, and control of the aircraft about its pitch axis may be obtained by oscillation of the auxiliary elevators 176 by control means previously described.

As the aircraft gains altitude, the valve plate 94 may be gradually opened so that exhaust gases from combustion chamber 62 may be ejected from the end of tailpipe extension 60. As the flow of gases through pipe extension 60 gradually increases, this causes the thrust force created thereby to be gradually increased thereby gradually accelerating the aircraft in a horizontal direction. Once the forward velocity of the aircraft has become sufficient so that the wings 16 and 14 may properly support the aircraft, then valve plates 70 and 72 may be completely closed and the valve plate 94 may be fully opened as shown in solid lines in FIGURE 6. The aircraft may be also accelerated in a forward horizontal direction by means of the auxiliary engines 270.

Once the aircraft has reached cruising speed so that it is fully supported by its wings, it may then be controlled from the cockpit of the aircraft in a conventional manner by ailerons 28, elevators 266 and rudders 262 and 26.

With the wheel well covers 258 closed, the wheel wells 220 are sealed and the aircraft may be landed on water and supported by its floats 210. With the wheels extended as shown in FIGURES 5 and 8, the aircraft may be landed on conventional runways.

In addition to the escape doors 268, additional doors 269 and 273 are provided at the rear of the fuselage. These doors may also be used for emergency escape, but the doors 273 are primarily intended to facilitate loading the aircraft.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An aircraft comprising a fuselage, power plant means capable of ejecting fluid mounted on the fuselage, an exhaust pipe extending longitudinally of the fuselage and rearwardly from the power plant means, duct means connecting the forward portion of said pipe to said power plant means so that the fluid ejected by said power plant means will flow into said pipe, said pipe being provided with an outlet nozzle whereby the fluid from said power plant means will be ejected from said nozzle for causing a forward thrust to be applied to said aircraft, and outlet opening in said pipe between its forward portion and outlet nozzle, valve means connected to said outlet opening, control means connected to said valve means for selectively opening and closing the same, said valve means when open permitting at least some of said fluid to flow downwardly from said opening so as to cause a reaction force tending to lift said aircraft, said pipe containing a closure valve between said outlet opening and said nozzle, second control means connected to said closure valve so as to selectively operate it for closing and opening said pipe, a helicopter type propeller, a vertical shaft connected to said propeller and rotatably journalled to said fuselage, a turbine connected to said shaft, means conducting fluid exhausted from said outlet opening to said turbine, both of said valve control means comprising remotely controlled hydraulic motors, wing means secured to said fuselage and extending laterally from opposite sides thereof, said propeller being rotatably mounted above said fuselage and wing means, auxiliary helicopter propellers rotatably mounted on said wing means, and an auxiliary turbine in said pipe drivingly connected to said auxiliary propellers by releasable means.

2. The combination of claim 1, wherein said auxiliary propellers include a first pair of propellers on top of said wing means and a second pair of propellers coaxial with said first pair and located below said wing means.

3. The combination of claim 2, wherein said helicopter type propeller is above both said pairs of auxiliary propellers, said wing means being provided with vents to permit free flow of air to and from all said propellers.

4. An aircraft comprising a fuselage, rotatable wings spaced above the fuselage for aerodynamically supporting the fuselage in vertical and forward flight, power plant means capable of ejecting fluid mounted on the fuselage, an exhaust pipe extending longitudinally of the fuselage and rearwardly from the power plant, duct means connecting a forward portion of said pipe to said power plant means so that the fluid ejected by said power plant means will flow into said pipe, said pipe being provided with an outlet nozzle whereby the fluid from said power plant means will be ejected from said nozzle for causing a forward thrust to be applied to said aircraft, an outlet opening in said pipe between the forward portion and the outlet nozzle, valve means connected to said outlet opening, control means connected to said valve means for selectively opening and closing the same, said valve means when open permitting at least some of said fluid to flow downwardly from said opening so as to cause a reaction force tending to lift said aircraft, means responsive to said downward flow of fluid for imparting rotation to the rotatable wings, air intake means provided in the nose of said aircraft for said power plant means, rudder means and elevator means movably mounted in said air intake means for controlling said aircraft.

5. The combination of claim 4, wherein said fuselage is provided with a plurality of floats therebelow, retractable wheels mounted in said floats.

6. The combination of claim 5, wherein said floats are provided with liquid storage compartments containing fuel adapted to be supplied to the power plant means.

7. In an aircraft having a fuselage adapted to be aerodynamically supported by fixed wings during forward flight and by rotating wings spaced thereabove during vertical movement, power means for producing an exhaust flow of fluid therefrom, flow passage means operatively connected to the power means for controllably directing said flow of fluid to selectively produce thrust in directions inducing said forward flight and vertical movement, selectively powered turbine means for imparting rotation to said rotating wings only in response to the flow of fluid inducing said vertical movement, continuously powered turbine means mounted in said flow passage means and operative in response to the flow of gas inducing either said vertical movement or forward flight, and auxiliary propeller means operatively connected to said continuously powered turbine means for producing a substantially vertical flow of air to either assist said vertical movement or positionably control the fuselage during said forward flight.

References Cited in the file of this patent

UNITED STATES PATENTS

| | | |
|---|---|---|
| 2,027,960 | Crossley | Jan. 14, 1936 |
| 2,384,893 | Crook | Sept. 18, 1945 |
| 2,687,779 | Peterson | Aug. 31, 1954 |
| 2,991,026 | Nelson et al. | July 4, 1961 |
| 3,045,949 | Stahmer | July 24, 1962 |
| 3,087,691 | Rainbow | Apr. 30, 1963 |

FOREIGN PATENTS

| | | |
|---|---|---|
| 217,516 | Australia | Oct. 10, 1958 |
| 811,840 | Great Britain | Apr. 15, 1959 |
| 871,257 | Great Britain | June 21, 1961 |